United States Patent Office 3,451,883
Patented June 24, 1969

3,451,883
METHOD FOR SHAPING A MATERIAL IMPREGNATED WITH A NITROCELLULOSE-PLASTICIZER HYDROSOL AND THE RESULTING SHAPED ARTICLE
Mark Plunguian, Newark, Del., assignor to Hercules Incorporated, Wilmington, Del., a corporation of Delaware
No Drawing. Filed Aug. 9, 1966, Ser. No. 571,190
Int. Cl. B32b 23/18; B44d 1/00; B29c 1/00
U.S. Cl. 161—46                 13 Claims

ABSTRACT OF THE DISCLOSURE

A process for preparing form-stable, shaped articles of nitrocellulose is taught wherein a filler material is impregnated with a nitrocellulose-plasticizer hydrosol and shaped while wet. Shaping can be effected by, e.g., casting or thermoforming. The filler material can be fibrous, particulate or in web form shaped articles that can be made include combustible cartridge cases and flash paper.

---

This invention relates to moldable compositions containing nitrocellulose, plasticizer and a filler and to methods of making form stable structures therefrom.

According to known prior art, it is possible to form moldable or formable filled nitrocellulose compositions. For example, U.S. 2,357,573 teaches the preparation and use of a composition comprising an homogeneous mixture of finely ground gypsum and nitrocellulose lacquer as a filler for wood, metal or the like. U.S. 2,093,213 relates to a similar type of composition comprising a nitrocellulose solution containing litharge having wood flour suspended therein. U.S. 2,114,300 teaches preparation of moldable compositions containing, inter alia, an inert filler and a nitrocellulose solution.

All of the filled nitrocellulose compositions of the prior art, as exemplified by the cited references, contain nitrocellulose in solution form. Due to the presence of the solvent, these compositions dry rather slowly and present certain handling hazards, as well as an undesirable expense occasioned by the loss of solvent.

It has now been found that some of the undesirable qualities of the filled nitrocellulose compositions of the prior art can be obviated by employing filled compositions based upon aqueous suspensions of nitrocellulose.

Accordingly, it is an object of this invention to provide moldable, filled nitrocellulose compositions prepared from aqueous suspensions or latices of nitrocellulose. More specifically, these compositions comprise a filler material impregnated with a nitrocellulose-plasticizer latex, the latex being substantially free of volatile solvent and capable of drying to form a continuous film of plasticized nitrocellulose. The invention also provides a molding process for preparing form stable shaped structures containing nitrocellulose, plasticizer, and a filler which comprises impregnating a filler with a substantially solvent-free latex of particulate nitrocellulose and plasticizer, shaping the resulting compositions, and removing water from the latex, whereby the nitrocellulose and plasticizer coalesce to form a matrix phase. The term "particulate nitrocellulose" is used to distinguish over nitrocellulose in the fibrous form in which it is usually supplied in commerce.

As will be pointed out later in this description, the plasticizers which are employed in the compositions of this invention are nonvolatile, or high boiling, solvents for nitrocellulose. Accordingly, it is necessary to draw a distinction between these solvent-plasticizers and the solvents which are employed to dissolve nitrocellulose in lacquer. The latter are volatile materials whose purpose is to evaporate at low temperature shortly after application of the lacquer to a substrate. When the instant compositions are referred to as being "substantially free of volatile solvents," or "substantially solvent-free" the reference is to such materials.

The efficacy of the nitrocellulose-plasticizer latex, sometimes referred to as a hydrosol, in the compositions and process of the instant invention, is related to the ability of the nitrocellulose particles to coalesce, in combination with the plasticizer, into hard, continuous films, upon drying. In order to assure this coalescing ability, the ratio of nitrocellulose to plasticizer in the latex is maintained within predetermined limits. Generally speaking this nitrocellulose to plasticizer ratio will be between about 40/60 and 80/20. Not all ratios included within this range are usable under all conditions of use of the compositions. For example at the higher ratios, about 60/40 and higher, the particles are not auto-coalescible at room temperature, but they can be made to coalesce with application of heat or with assistance of other coalescing aids. At the lower ratios the particles are coalescible at low temperatures, but under some conditions will form only a tacky film. Particles in this range can be used only with fillers capable of absorbing this tackiness. The selection of nitrocellulose to plasticizer ratio is also influenced by the anticipated end use of the composition, since the flexiblity, temperature sensitivity, and other properties desired in the finished structure can determine whether a high or low ratio is desirable.

The particles in suspension can contain both nitrocellulose and plasticizer. That is to say, the nitrocellulose contained in the particles is already plasticized. In other cases the nitrocellulose can be unplasticized with a water-insoluble plasticizer being dispersed in the water in a separate phase. Thus when the water evaporates from the latex, the separate particles of nitrocellulose and plasticizer come into contact and coalescence into a film is effected.

In still other cases, a water-soluble plasticizer can be dissolved in the aqueous phase of the latex. Here again, on evaporation of the water, all the plasticizer is concentrated from the water phase and becomes absorbed in the nitrocellulose whereupon coalescence of the nitrocellulose particles results.

The latex and its formation are known. For instance, they can be formed by emulsifying a nitrocellulose lacquer containing plasticizer in water and removing the volatile solvent to leave behind a suspension of fine plasticized nitrocellulose particles in water. In this case the nitrocellulose particles contain plasticizer as an integral part of the particle. In the case of the standard, normally used nitrocellulose lacquer, the particles usually have a nitrocellulose-plasticizer ratio of about 60/40. This amount is provided primarily for the purpose of imparting flexibility to the nitrocellulose film formed by the lacquer. To be useful in the compositions of this invention, it is preferred that the particles have a minimum nitrocellulose-plasticizer ratio of at least about 60/40 to permit the same to flow, upon application of heat, if necessary, and coalesce into a continuous film without the assistance of lacquer solvent. Part of the plasticizer may be relatively volatile, such as, e.g., diethyl succinate (B.P. 217. 8° C.) so that upon force drying the final composition this plasticizer will be driven oc, leaving a nitrocellulose rich coating.

One nitrocellulose latex which is particularly useful in the compositions according to this invention since it can readily be prepared in room temperature coalescible form with a relatively wide range of nitrocellulose-plasticizer atios is a mixed particle latex disclosed in copending U. S. application Ser. No. 543,074, filed Apr. 18, 1966, by K. F. Lin. This latex comprises a mixture of hard or underplasticized nitrocellulose particles and soft or overplasticized particles. Generally, the nitrocellulose-plasticizer ratio of the hard particles is between about 90/10 and 70/30, while that of the soft particles is about 40/60 to 0/100. The two are blended to yield an overall nitrocellulose-plasticizer ratio of about 70/30 to 50/50 by weight. The hard particles are incapable of self-coalescense to form a film at low temperature, whereas the soft particles are coalescible, but they contain such a great amount of plasticizer thta they cannot solidify to form a hard film. By combining these hard and soft particles in proper ratios, compositions containing the desired overall nitrocellulose-plasticizer ratio for forming hard films at room or relatively low temperature can be prepared. When the water is removed from these latices, the physical contact between the hard and soft particles causes plasticizer migration from the soft to the hard particles, eventually reaching an equilibrium condition which results in formation of a hard film. Such hard and soft particle latices can be prepared, as explained above, from emulsions of nitrocellulose lacquers of different nitrocellulose to plasticizer ratio.

Latices useful in forming the moldable compositions of this invention can also be formed by simply dispersing small particle nitrocellulose and plasticizer in water under the influence of suitable emulsifying or suspending agents. Methods useful for preparing such latices are known. Such a method is taught, e.g., by U.S. Patent 3,198,645.

Nitrocellulose-plasticizer latices can be prepared containing up to about 60% by weight formulated nitrocellulose plasticizer particles. This represents another advantage of the instant compositions over filled nitrocellulose compositions based upon nitrocellulose-plasticizer solutions. Such solutions can not contain more than about 30% by weight nitrocellulose without their viscosity becoming unreasonably high so that the compositions become unworkable. When working with a latex as in the compositions of this invention, the viscosity is substantially independent of nitrocellulose concentration so that higher nitrocellulose content is attainable. The viscosity of the latex is also independent of the molecular weight of the nitrocellulose so that nitrocellulose which can not be used in lacquers at practical concentrations can be used in latices.

The term modable, as used herein, is intended to refer to any type of shaping or forming. This includes, e.g., various types of thermoforming and compression molding, laminating, casting, and forming as in filling or patching cracks or holes in an adherable substrate.

Accordingly, the filler can be particulate or fibrous, and if the latter, it can be a web-like structure such as paper or cloth. In fact, a preferred form of filler material is paper. In this embodiment of the invention, a plurality of layers of paper can be soaked in the latex to impregnate the paper fibers which are then laid up or wrapped to form a laminate with only moderate pressure. Upon coalescence and solidification of the nitrocellulose particles, a rigid, high strength structure results. Such structures can be wound in tubular form to prepare, inter alia, combustible cartridge cases.

In another preferred embodiment of the compositions of this invention, a particulate filler such as gypsum or wod flour is suspended in the latex to form a thick, viscous paste. Such a composition drys at room temperature to form a hard composition which can be sanded or otherwise finished as desired. Such compositions can be cast to form shaped objects or they can be used as wood fillers or the like. Other particulate fillers which can be used in the compositions according to this invention include such materials as kaolin clay, wood fibers, inorganic pigments, asbestos, metal powders and the like.

The filler material can also be fibrous in form, as, e.g., wood pulp, cotton linters, fibrous nitrocellulose, fibrous cellulose acetate, or the like. The compositions containing such fibrous fillers are shapeable to yield hard, strong compositions. They can be shaped by extrusion or compression molding. For example, such compositions containing nitrocellulose fibers and wood plup can be used to prepare excellent, rapid burning "flash paper."

Any of the known nitrocellulose grades can be employed in the practice of this invention. These range from the so-called plastic grade nitrocellulose having about 10.9% nitrogen up to the smokeless powder grade having about 13.5% nitrogen. For most applications, nitrocellulose containing about 12% nitrogen, so-called lacquer grade nitrocellulose is quite satisfactory. Ultimately, however, selection of the nitrocellulose type to be employed depends upon the specific properties sought. For example, lacquer grade would be preferred for wood filler; smokeless grade would be preferred for a combustible cartridge case.

Nitrocellulose plasticizers are usually classified as primary (solvents) or secondary (softeners) plasticizers. The solvnt type plasticizers are employed in the compositions according to this invention. These are principally nonvolatile materials which boil at higher than about 250° C. and which are able to convert the nitrocellulose to a gel or even to a solution if used in sufficient quantity.

Examples of solvent type plasticizers having a high degree of solvency for nitrocellulose which can be used in this invention include glyceryl monoacetate, glyceryl diacetate, tris(tetrahydrofurfuryl)phosphate, triethylene glycol monoacetate, triethylene glycol diacetate, triethylene glycol di-2-ethyl butyrate, tributoxyethyl phosphate, triethyl citrate, acetyl triethyl citrate, diisobutyl adipate, dibutyl itaconate, dibutyl sebacate, diethyl tartrate, tetraethylene glycol di-2-ethyl caproate, dibutyl tartrate, di-(benzoyl triethylene glycol)phthalate, dibutyl phthalate, di-2-ethylhexyl adipate, dioctyl adipate, dioctyl azelate, di-2-ethylhexyl azelate, dioctyl sebacate, dioctyl phthalate, lower alkyl phosphates, aryl phosphates, alkyl aryl phosphates, butyl phthalylbutyl glycolate, chlorinated biphenyl, butyl benzyl phthalate, acetyl tributyl citrate, and chloroalkyl phosphates.

In addition to one or more of the conventional nonvolatile plasticizers a more volatile plasticizer can be included as discussed previously to serve as a coalescing aid which will be driven off by the forced drying of the compositions. Such coalescing aid should have a boiling point of about 150 to about 240° C. Examples of such coalescing aids include diethyl succinate, diethyl glycol monoethyl ether, diethylene glycol monoethyl ether acetate, butyl Cellosolve and Cellosolve acetate. The coalescing aid, when used, is usually present in amounts up to about 90% of the total plasticizer.

The use of the above-mentioned coalescing aids is an advantage in cases where it is intended that the end product should be highly combustible since its removal leaves behind a composition richer in nitrocellulose.

In order to assure that the nitrocellulose particles remain in suspension in the latex, an emulsifier or protective colloid is customarily included in the latex compositions. This can be any of the emulsifiers commonly used in preparing nitrocellulose lacquer emulsions and nitrocellulose suspensions. Typical of these emulsifiers are alkyl phenyl ethers of ethylene oxide condensates, alkyl phenyl sulfonates, sodium or potassium oleates, and water-soluble cellulose derivatives such as methyl cellulose, inter alia.

Other additives such as stabilizers and explosive stabilizers for the nitrocellulose, and pigments can be included in the compositions. For those compositions whose end use will also serve a decorative purpose, modifying resins of the type normally used to promote gloss and depth of the nitrocellulose film can be added. When water resistance is a desideratum of the finished dried structures, wax emulsions of various types can be included in the compositions. The addition of a thermosetting crosslinking agent, such as an amino resin can contribute solvent resistance to the finished object.

The following examples of the invention are presented as illustrative thereof. Parts and percentages are by weight unless otherwise expressly stated.

EXAMPLE 1

A nitrocellulose lacquer was prepared by dissolving 60 parts of fibrous nitrocellulose (~13% N, ½ sec. visc.) and 40 parts of butyl phthalyl butyl glycolate in 200 parts ethyl acetate. This solution was added, with vigorous agitation, to 200 parts of water containing 5 parts of an emulsifier comprised of the sodium salt of a sulfated condensate of an alkylphenol and ethylene oxide. Agitation was continued until a smooth, stable, homogeneous emulsion was formed. The solvent was removed by stripping under partial vacuum at 60° C. while continuing agitation. When all of the solvent was removed, as indicated by a drop in partial pressure, it was further concentrated to a fluid, smooth flowing nitrocellulose plasticizer latex containing about 54% solids.

Unsized, wet strength paper was immersion coated with the above latex and laminated into a hollow tube by winding on a mandrel. The resulting tube was heated to about 100° C. on the mandrel to drive off water, coalesce the nitrocellulose particles and fix the shape of the tube.

The resulting tube was completely combustible and was useful as a combustible cartridge case.

EXAMPLE 2–4

Other latrices were prepared similar to those in Example 1 having the following formulations.

| Component | Ex. 2 | Ex. 3 | Ex. 4 |
|---|---|---|---|
| Nitrocellulose | 60 | 60 | 60 |
| Butyl benzyl phthalate | | 10 | 10 |
| Butyl phthalyl butyl glycolate | 40 | | |
| Diethyl succinate | | 30 | 30 |
| Diphenyl amine | 6 | 6 | |
| Emulsifier of Ex. 1 | 5 | 5 | 5 |
| Water | 89 | 102 | 89 |
| Percent non-volatiles | 55.3 | 52.0 | 54 |

These compositions were employed to form laminates with paper as described in Example 1, which were suitable for use as combustible cartridge cases.

EXAMPLE 5

A nitrocellulose latex having mixed hard (underplasticized) and soft (overplasticized) particles was prepared by blending 50 parts of a latex wherein the particles had a 40/60 nitrocellulose to plasticizer ratio with 100 parts of a latex having a 90/10 nitrocellulose to plasticizer ratio. The resultant latex had nitrocellulose to plasticizer ratio of about 65/35. These latices were prepared by stripping solvent from lacquer emulsions containing nitrocellulose to plasticizer in the prescribed ratios along with emulsifier. The plasticizer in each case was tributoxyethyl phosphate.

To 12 parts of this latex was added with kneading 1 part wood flour and 7 parts of kaolin clay.

This composition was applied by means of a putty knife to fill cracks and holes in a wood panel. Upon drying, the filler showed no tendency to check or crack and adhered very well to the wood. The hard surface of the filler was sanded to remove excess without disturbing the bond between the wood and filler in the cracks. Upon application of paint to the surface, the filled portion was inconspicuous.

EXAMPLE 6

A nitrocellulose latex wherein the nitrocellulose-plasticizer ratio was 40/60 was prepared by stripping solvent from an emulsified lacquer prepared as in Example 1. Ordinarily such a latex forms a soft, tacky film after drying of the water.

To 30 parts of the above latex was added 20 parts of fibrous nitrocellulose particles and 1 part of a protective colloid to yield a stiff, workable mass. This mass was extruded through a die and dried into a tubular structure which was suitable for use as a combustible cartridge case.

EXAMPLE 7

A nitrocellulose latex having a nitrocellulose-plasticizer ratio of 9:1 was prepared by stripping solvent from an emulsified lacquer prepared as in Example 1, containing 54% solids. This latex was modified by addition of plasticizer and wax as follows:

Plasticizer emulsion

One hundred-fifty (150) grams of butyl benzyl phthalate was mixed with 3 grams of a surface-active agent consisting of the polyoxyethylene esters of mixed tall oil fatty and resin acids. This mixture was poured with vigorous continuous agitation into 75 grams of water containing 0.36 gram of the sodium salt of dioctylsulfosuccinate to produce an emulsion containing 66.6% of butyl benzyl phthalate.

Wax emulsion

One hundred ninety-six and six tenths (196.6) grams of refined paraffin wax having a melting point of 135–137° F. was melted and mixed hot with 5.9 grams of a surface-active agent consisting of the polyoxyethylene esters of mixed tall oil fatty and resin acids, and with 2 grams of stearic acid. This mixture was poured with continuous vigorous agitation into 232 grams of hot water containing 0.4 gram of potassium hydroxide. The resulting emulsion was reheated, homogenized while hot by passing through a colloid mill, allowed to cool to room temperature without disturbance, and then was screened by passing through a U.S. Standard Sieve No. 60. The resulting wax emulsion contained 43.3% by weight of nonvolatile content.

These three compositions were combined in the ratio of 100 parts nitrocellulose-plasticizer latex, 64.8 parts plasticizer emulsion and 2.3 parts wax emulsion. The resultant mixture was about 49.5% nitrocellulose, about 49.5% plasticizer and about 1% wax with a total nonvolatile content of about 58.7%.

A wood filler was prepared containing 12 parts of the nitrocellulose-plasticizer-wax composition, 1 part wood filler and 7 parts kaolin clay. When employed in filling cracks and holes as in Example 5, this product exhibited greater water resistance.

EXAMPLE 8

A nitrocellulose-plasticizer latex was prepared as in Example 7 but omitting the wax emulsion. To 100 parts of this latex was added 23.4 parts of a 50% solution of a water-soluble adhesive type urea-formaldehyde resin and immediately thereafter 8.3 parts wood flour and 58.1 parts kaolin clay. The filled composition was thoroughly dried and cured, by heating at 80° C. for 30 minutes. Solubility tests indicate that the amino resin modified composition is no longer soluble in nitrocellulose solvents, whereas that prepared as in Example 5 is soluble to substantially the same extent as is nitrocellulose.

What I claim and desire to protect by Letters Patent is:

1. The process of making form-stable structures containing nitrocellulose and plasticizer which comprises impregnating a fibrous web with a substantially solvent free latex of particulate nitrocellulose and a solvent type nitrocellulose plasticizer, said nitrocellulose and plasticizer being present in the ratio of 40/60 to 80/20, shaping the resulting impregnated fibrous web, and removing the water whereby the nitrocellulose and plasticizer coalesce to form a matrix.

2. The process of claim 1 where the shaping is effected by lamination followed by thermoforming.

3. The process of claim 1 where the shaping is effected by winding the impregnated fibrous web into a tubular configuration.

4. The process of claim 1 where the fibrous web is paper.

5. The process of making form-stable structures containing nitrocellulose, which comprises impregnating a filler in the form of discrete particles or loose fibers with a substantially solvent-free latex of particulate nitrocellulose and a solvent-type nitrocellulose-plasticizer, said nitrocellulose and plasticizer being present in the ratio of 40/60 to 80/20, shaping the resulting material by extrusion through a shaping die, and removing the water whereby the nitrocellulose and plasticizer coalesce to form a matrix.

6. A moldable material comprising a fibrous web impregnated with a particulate nitrocellulose-solvent type plasticizer latex essentially free from volatile solvents, wherein the nitrocellulose to plasticizer ratio is between 40/60 and 80/20, and capable of drying to form a continuous plasticized nitrocellulose matrix wherein the nitrocellulose-plasticizer latex comprises a mixture of hard and soft nitrocellulose particles, said hard particles having a nitrocellulose-plasticizer ratio of about 90/10 to 70/30 and said soft particles having a nitrocellulose to plasticizer ratio of about 40/60 to 0/100 and the ratio of said hard particles to soft particles being such that the overall nitrocellulose to plastizer ratio in the composition is between about 70/30 and 50/50.

7. The material of claim 6 where the nitrocellulose-plasticizer is tributoxyethyl phosphate.

8. The material of claim 6 where the nitrocellulose-plasticizer is butyl phthalyl butyl glycolate.

9. The material of claim 6 where the nitrocellulose-plasticizer is butyl benzyl phthalate.

10. The material of claim 6 where the nitrocellulose-plasticizer comprises 10–100% of a substantially non-volatile plasticizer having a boiling point greater than 250° C. and 0–90% of a volatile plasticizer having a boiling point less than 240° C.

11. The material of claim 6 including up to about 1% wax based on the total weight of nitrocellulose and plasticizer.

12. The material of claim 6 including about 20% of a water-soluble amino resin based on the total weight of nitrocellulose and plasticizer.

13. A shaped article prepared by the process of claim 1.

References Cited

UNITED STATES PATENTS

| | | | |
|---|---|---|---|
| 2,563,708 | 8/1951 | Crane | 106—170 |
| 2,740,723 | 4/1956 | Voris | 106—170 |
| 2,843,582 | 7/1958 | Voris | 106—170 |
| 3,198,645 | 8/1965 | Plunguian | 106—170 |

ALLAN LIEBERMAN, *Primary Examiner.*

U.S. Cl. X.R.

106—170, 177, 178, 180, 181, 183, 184; 117—157, 166; 156—184; 264—136